United States Patent [19]

Hemmati

[11] Patent Number: 5,408,480
[45] Date of Patent: Apr. 18, 1995

[54] LASER WITH OPTICALLY DRIVEN Q-SWITCH

[75] Inventor: Hamid Hemmati, Encino, Calif.

[73] Assignee: The United States of America as represented by the Administrator of the National Aeronautics and Space Administration, Washington, D.C.

[21] Appl. No.: 94,332

[22] Filed: Jul. 15, 1993

[51] Int. Cl.⁶ .............................................. H01S 3/11
[52] U.S. Cl. ......................................... 372/10; 372/11
[58] Field of Search ............................ 372/10, 11, 12; 359/244, 299; 385/4, 23

[56] References Cited

U.S. PATENT DOCUMENTS

| | | | |
|---|---|---|---|
| 3,747,019 | 7/1973 | Koechner et al. | 331/94.5 |
| 3,958,863 | 5/1976 | Isaacs et al. | 350/161 |
| 4,166,254 | 8/1979 | Bjorkland | 359/299 |
| 4,464,758 | 8/1984 | Chenausky et al. | 372/11 |
| 4,752,931 | 6/1988 | Dutcher et al. | 372/18 |
| 4,860,296 | 8/1989 | Chemla et al. | 372/11 |
| 5,005,176 | 4/1991 | Lam et al. | 372/10 |
| 5,014,277 | 5/1991 | Van Driel et al. | 372/18 |
| 5,080,504 | 1/1992 | Partain et al. | 385/4 |
| 5,119,227 | 6/1992 | Dawson et al. | 372/11 |
| 5,121,245 | 6/1992 | Johnson | 359/285 |
| 5,121,402 | 6/1992 | Scheps | 372/70 |
| 5,220,579 | 6/1993 | Urakami et al. | 372/10 |

FOREIGN PATENT DOCUMENTS 0466477  1/1992  European Pat. Off. .............. 372/10

Primary Examiner—Rodney B. Bovernick
Assistant Examiner—Robert McNutt
Attorney, Agent, or Firm—John H. Kusmiss; Thomas H. Jones; Guy M. Miller

[57] ABSTRACT

An optically driven interactive Q-switch, i.e., a Q-switch that responds to a short pulse of light, for example, from external light-emitting diodes (LEDs) or diode lasers, is provided for producing an output laser pulse from electronic energy stored in a laser medium. Q-switching is thus achieved on demand by electrically pulsing the light source to produce a pulse of light directed onto a Q-switch medium in the laser cavity. Electronic control of the light pulse from the external source will thus provide not only efficient Q-switching frequency but also independent control of output laser pulse width with a fast rise time for each output laser pulse.

4 Claims, 1 Drawing Sheet

LASER WITH OPTICALLY DRIVEN Q-SWITCH

ORIGIN OF INVENTION

The invention described herein was made in the performance of work under a NASA contract, and is subject to the provisions of Public Law 96-517 (35 USC 202) in which the contractor has elected not to retain title.

TECHNICAL FIELD

The invention relates to an optically driven laser Q-switch, and more particularly to a laser having a Q-switch that is driven by an external optical radiation to control the generation of output light from a pumped lasing medium.

BACKGROUND ART

In practice, Q-switches are used with lasers to generate output laser pulses of short pulse-width and high peak power. Q-switching is a process of first setting the cavity loss in a laser cavity to a high level in order to allow the lasing medium in the cavity to increase population inversion and then momentarily switching the cavity loss to a low level, causing the laser to oscillate, thus producing a higher population inversion level which is then released in the form of a short, high-power laser output pulse. A Q-switch may thus be viewed as an intracavity shutter for the laser. The primary objective of a Q-switch is therefore to create a high-cavity loss by, in essence, blocking one of the cavity mirrors and then to momentarily switch to a low-cavity loss by unblocking the mirror. Many techniques have been developed to achieve this objective.

The simplest and most primitive Q-switching technique is rotating a mirror attached to a highspeed motor shaft. The laser oscillates while the revolving mirror is facing the other mirror of the laser cavity, i.e., while the rotating mirror is in a position to create a low cavity loss condition. A high cavity loss is created at all other times.

An electro-optic Q-switch uses an electro-optic crystal which becomes birefringent when subjected to high electric voltage to create a cavity loss. Although this Q-switching technique is fast and precise, thus providing control over the peak output pulse width independent of output pulse frequency, it has some disadvantages. The electro-optic crystal is subject to optical damage at high intensities, and requires a very fast rising, high voltage pulse driver which tends to be very power consuming, particularly at high (>10 kHz) pulse repetition rates.

Acousto-optic Q-switching techniques use an acousto-optic modulator to produce an rf acoustic wave in order to Bragg-diffract the light out of the cavity. This technique is simple and operates well at a kilohertz repetition rate, but like the revolving mirror Q-switch, it has a very slow opening time and does not work well with high-gain lasers.

A passive Q-switch, such as saturable-absorber Q-switch (also known as dye-cell Q-switch) uses some form of light absorbing material that saturates when the gain inside the cavity exceeds a certain level, at which time the laser begins oscillating.. The dye then quickly drops below its saturation level and oscillation stops. The process automatically repeats to produce successive laser output pulses without the need for any external energy or control. Passive Q-switches are widely used because they are simple, but they have significant limitations, such as pulse-by-pulse amplitude fluctuation and no control over frequency of Q-switching or output pulse width.

Although there have been many advances in the field of Q-switching, there is still a need for a fast, efficient, and stable Q-switching technique that operates at controlled output pulse widths independent of output pulse frequency.

STATEMENT OF THE INVENTION

The present invention provides an optically driven interactive Q-switch, i.e., a Q-switch that responds to a short pulse of light, for example, from external light-emitting diodes (LEDs), or diode lasers for producing an output laser pulse from electronic energy stored in a laser medium. Q-switching is thus achieved on demand by electrically pulsing the light source to produce a pulse of light directed to a Q-switch medium in the laser cavity. Electronic control of the light pulse from the external source will thus provide not only efficient Q-switching frequency but also independent control of output laser pulse width with a fast rise time for each output laser pulse. The application of optical Q-switching through electronic control of light-emitting diodes (LEDs) and laser diodes for effecting Q-switching requires less power than conventional electro-optic, acousto-optic and magneto-optic Q-switches.

DETAILED DESCRIPTION OF THE INVENTION

Figure 1:
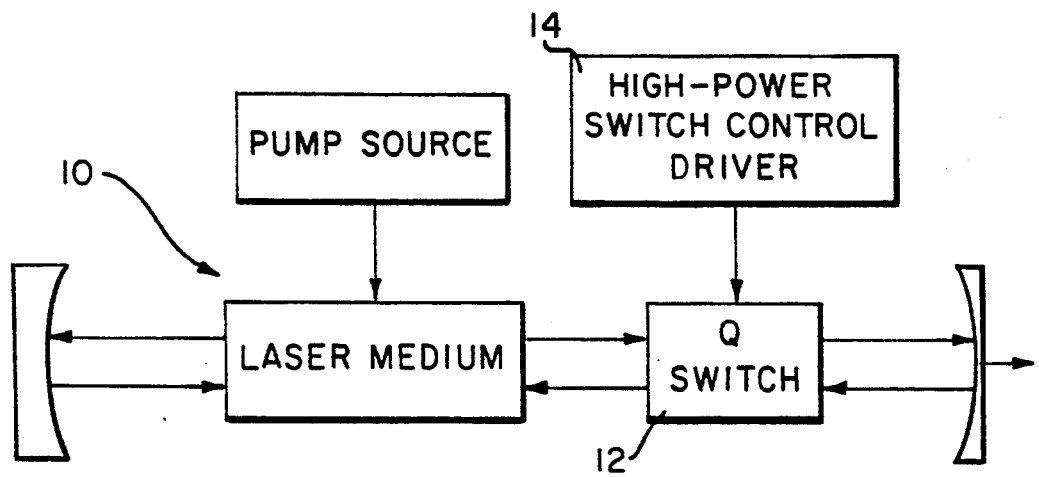
FIG. 1 is a schematic drawing of a conventional laser Q-switch.

Prior-art lasers 10 illustrated in FIG. 1 have conventional active Q-switches 12 that are externally driven by a high-power switch control driver 14. They include acousto-optic (A–O), electro-optic (E–O) and magneto-optic (M–O) switching devices. These Q-switches are active and require external high-power drivers.

A dye-cell Q-switch (not shown), also known in the prior art, is passive, i.e., does not require any external driver, but even though passive and simple in structure, it is operationally complex and operates only at an uncontrolled repetition frequency, as noted hereinbefore. It is therefore not useful in many applications that require controlled switching.

In accordance with the present invention, a new class of active Q-switches is provided where a low-power external optical pulse is used to alter the Q of the laser cavity, thereby to manipulate a high-power output light source with a low-power light source. The external optical pulse may be produced by a variety of devices. However, for simplicity, all of the Q-switches contemplated are driven by only one or more LEDs or diode lasers. The output pulses of these sources are easily controlled by direct modulation of low-level input control current.

Since diode lasers have very high electrical-to-optical conversion efficiencies (>30%), the efficiency of the Q-switched laser is increased accordingly, and the need for complicated high-power switching devices as those used in conventional active Q-switches is avoided. Depending on the material used for the Q-switches, an increase of between 50% and 90% in electrical efficiency may be achieved for the Q-switch. This is particularly attractive for space-borne Q-switched lasers where high efficiency is sought. Although applicable to all lasers, the present invention of Q-switches that are externally driven by low-power LEDs or diode lasers will be most suited to diode-pumped solid-state lasers.

Figure 2:
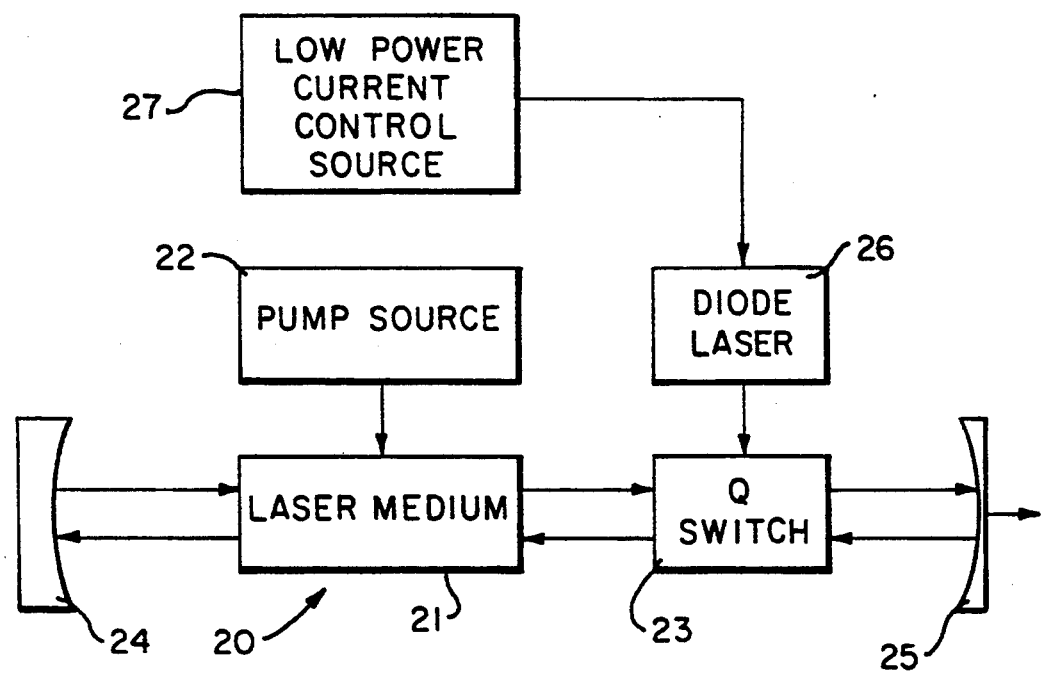
FIG. 2 is a schematic diagram of the present invention employing an optically driven Q-switch for a solid-state laser.

FIG. 2 illustrates schematically a solid-state laser 20 comprising an Nd:host crystal 21 pumped by a source 22 comprising LEDs or diode lasers and an optically driven Q-switch 23 inside a typical laser cavity defined by mirrors 24 and 25. The external optical pulse may be applied to the Q-switch 23 either laterally or longitudinally. The Q-switch medium may be a solid, liquid, or gas.

To maintain the efficiency of the laser 20 as high as possible, one of the requirements on the medium of the Q-switch 23 is that it be highly transparent (>99%) at the wavelength of the laser 20. The rate of switching the Q-switch 23 is determined only by the modulation rate of an external diode laser 26, which is in turn controlled by modulation of a low-power current from a source 27. Several possible schemes for such an optically driven Q-switch 23 will now be described.

Photo-Induced Absorption

In this scheme, an external diode laser matched in wavelength to the absorption band of the Q-switch medium creates an excited state such that the wavelength of one of its transitions to another upper state corresponds to the laser wavelength. When periodically pumped by the external optical source, it acts as a periodic laser beam absorber and therefore a periodic intracavity shutter.

Upon illumination of an optically driven Q-switch medium located inside the laser cavity with an external light source, the laser's intracavity beam may be absorbed by the otherwise transparent medium through an atomic or a molecular transition. Abruptly terminating the external light beam immediately restores the transparency of the medium. Q-switches based on this approach can be ultrafast and suitable for high-power lasers. Specific examples given below are based on known atomic and molecular transitions and do not represent the full potential or range of materials for this technique. Many other materials may be found that are satisfactory.

Example

Neutral sodium (Na) vapor becomes highly absorbing at 1057.2 nm when irradiated at the 330.2 nm atomic resonance line (ground state of the atom to an allowed upper level). The 1057.2 wavelength coincides with the Nd:CaMoO$_4$ laser line. Therefore, a medium based on sodium atoms may be used to optically Q-switch a Nd:CaMoO$_4$ laser.

Example

Dye solutions, such as certain coumarin, rhodamine, and other dyes are commonly transparent in the 1 micron region (lasing wavelength of many solid-state laser materials). Upon excitation at specific wavelengths in the 450 to 950 nm region (emitting wavelength of semiconductor lasers and LEDs) excited-state absorption in the one micron (1 μm) region becomes sufficiently large to induce a loss in the laser causing the medium to act as a Q-switcher if it is illuminated with a modulated light beam. Instead of dye solutions, dyes embedded in plastics may be used. However, molecular-medium Q-switches will be subject to chemical reaction and photochemical degradation in use over a period of time.

Quartz crystal Shutter

In this case, the Q-switch 23 is implemented by a crystal that is driven at its resonant frequency by use of externally applied photons. For example, a quartz crystal doped with a heavy element ion (such as Nd ion) can be driven at its resonant frequency upon irradiation with light, such as light from a semiconductor laser operating in the 450 nm to 2000 nm wavelength range. Specific light source (diode laser or LED) wavelengths will be required depending on the absorption band of the dopant in the crystal oscillator.

The quartz crystal oscillator (shutter) operates in the double-ended tuning fork mode. With the quartz oscillator, one may take advantage of: effect of polarization changes on a polarized intracavity beam; or deflection of the intracavity beam for Q-switching applications. A limitation of this type of Q-switch medium is that the switching frequency is fixed and cannot be varied for a given switching medium. The resonant frequency of the unstressed quartz crystal oscillator can be arranged to vary, for example, in the 1 kHz to 100 kHz range depending on the crystal dimensions.

Although particular embodiments of the invention have been described and illustrated herein, it is recognized that modifications and variations may readily occur to those skilled in the art. For example, the switching light may be delivered to the Q-switch through a guiding medium, such as fiber optics. Consequently, it is intended that the claims be interpreted to cover such modifications and equivalents. The invention may result in a 50% to 90% increase in efficiency over conventional electro-optic, acousto-optic and magneto-optic Q-switches that are externally driven, depending on the Q-switch material.

I claim:

1. A Q-switch laser comprising a laser cavity, lasing medium within said cavity, means for pumping said lasing medium to achieve population inversion for producing intracavity optical radiation of a specified wavelength, an interactive, optically driven Q-switch comprising a medium having a known absorption band, an extracavity source of optical radiation of a wavelength significantly different from said specified wavelength, said Q-switch medium comprising atoms or molecules selected to be highly absorbing to said intracavity optical radiation from said lasing medium when driven by said extracavity optical radiation optically coupled thereto, said Q-switch medium being positioned in said laser cavity to so provide high cavity loss as to block a laser beam from being produced in said laser cavity by absorbing optical radiation at said specified wavelength while atoms or molecules of said Q-switch medium are being driven by said extracavity source of optical radiation matched in wavelength to said absorption band of said Q-switch medium to create a transition from a ground state to an excited state of said Q-switch medium, said Q-switch medium being transparent to said intracavity radiation when said source of extracavity optical radiation is terminated, and electronically controlled means for initiating and terminating said optical radiation from said extracavity source, thereby to allow said lasing medium in said cavity to accumulate a high degree of inversion until said optical radiation from said extracavity source to said interactive, optically driven Q-switch medium is terminated, whereupon a high power laser beam pulse is produced by lasing in said laser cavity.

2. A Q-switch laser as defined in claim 1 wherein said electronically controlled means for initiating and terminating said optical radiation from said extracavity source coupled to said interactive, optically driven Q-switch medium comprises at least one light-emitting element, and means for electrically controlling said light-emitting element.

3. A Q-switched laser comprising a laser cavity, lasing medium within said cavity, means for pumping said lasing medium to achieve population inversions, an interactive, optically driven Q-switch positioned in said laser cavity to provide high cavity loss, except while irradiated by light, thereby to allow said lasing medium in said cavity to increase the amount of population inversion until said cavity loss is switched to a low level by a pulse of light coupled to said interactive, optically driven Q-switch, an electronically controlled means for producing said pulse of light coupled to said interactive, optically driven Q-switch, wherein said interactive, optically driven Q-switch positioned in said laser cavity comprises a crystal oscillator driven at its resonant frequency by external optical radiation from an electronically controlled light-emitting element to operate said crystal oscillator in a double-ended tuning fork mode at a fixed shutter rate for a given crystal switching medium, said electronically controlled means for producing said pulse of light coupled to said interactive, optically driven Q-switch comprises at least one light-emitting element, and means for electrically controlling said light-emitting element.

4. A Q-switched laser comprising a laser cavity, lasing medium within said cavity, means for pumping said lasing medium to achieve population inversion for producing intracavity optical radiation of a specified wavelength, an extracavity source of optical radiation of a wavelength significantly different from said specified wavelength, electronically controlled means for initiating and terminating optical radiation of extracavity optical source comprising at least one light-emitting element, and means for electrically controlling said light emitting element, an interactive, optically driven Q-switch coupled to said source of extracavity optical radiation and positioned in said laser cavity to block said intracavity optical radiation at said specified wavelength from producing a laser beam only while being driven by said extracavity optical radiation, said interactive, optically driven Q-switch being transparent to said intracavity optical radiation at said specified wavelength while not being driven by said extracavity optical radiation, and said interactive, optically driven Q-switch comprises a crystal oscillator having a resonant frequency selected to be opaque to said optical radiation from said lasing medium when driven at said resonant frequency by said extracavity optical radiation and transparent to said intracavity optical radiation while not being driven by said extracavity optical radiation, thereby creating a laser beam shutter in said laser cavity for blocking intracavity optical radiation while said interactive, optically driven Q-switch is being driven by said extracavity optical radiation to operate in a double-ended tuning fork mode at a fixed shutter rate to accumulate a high degree of population inversion during each shutter cycle.

* * * * *